J. McCURRY.
HOVERING FLIGHT AEROPLANE SYSTEM.
APPLICATION FILED OCT. 7, 1915.
1,181,784.
Patented May 2, 1916.
2 SHEETS—SHEET 2.
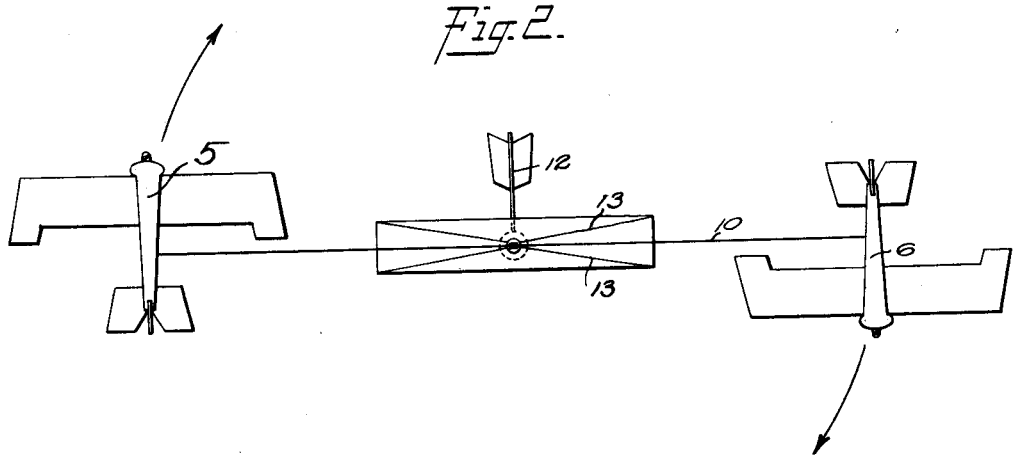
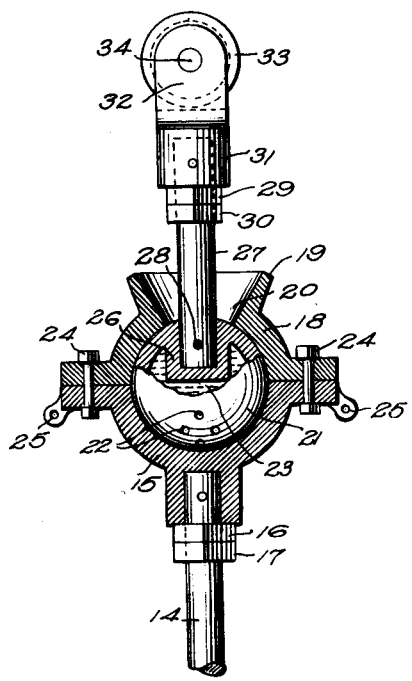
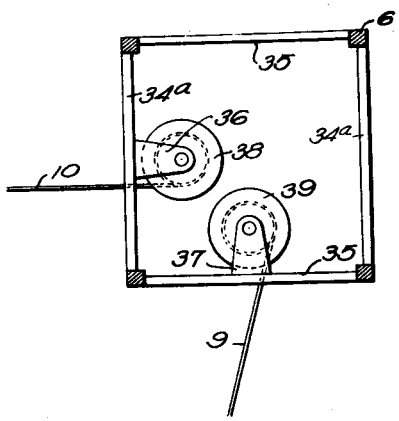
WITNESSES
INVENTOR
John McCurry
BY
ATTORNEYS

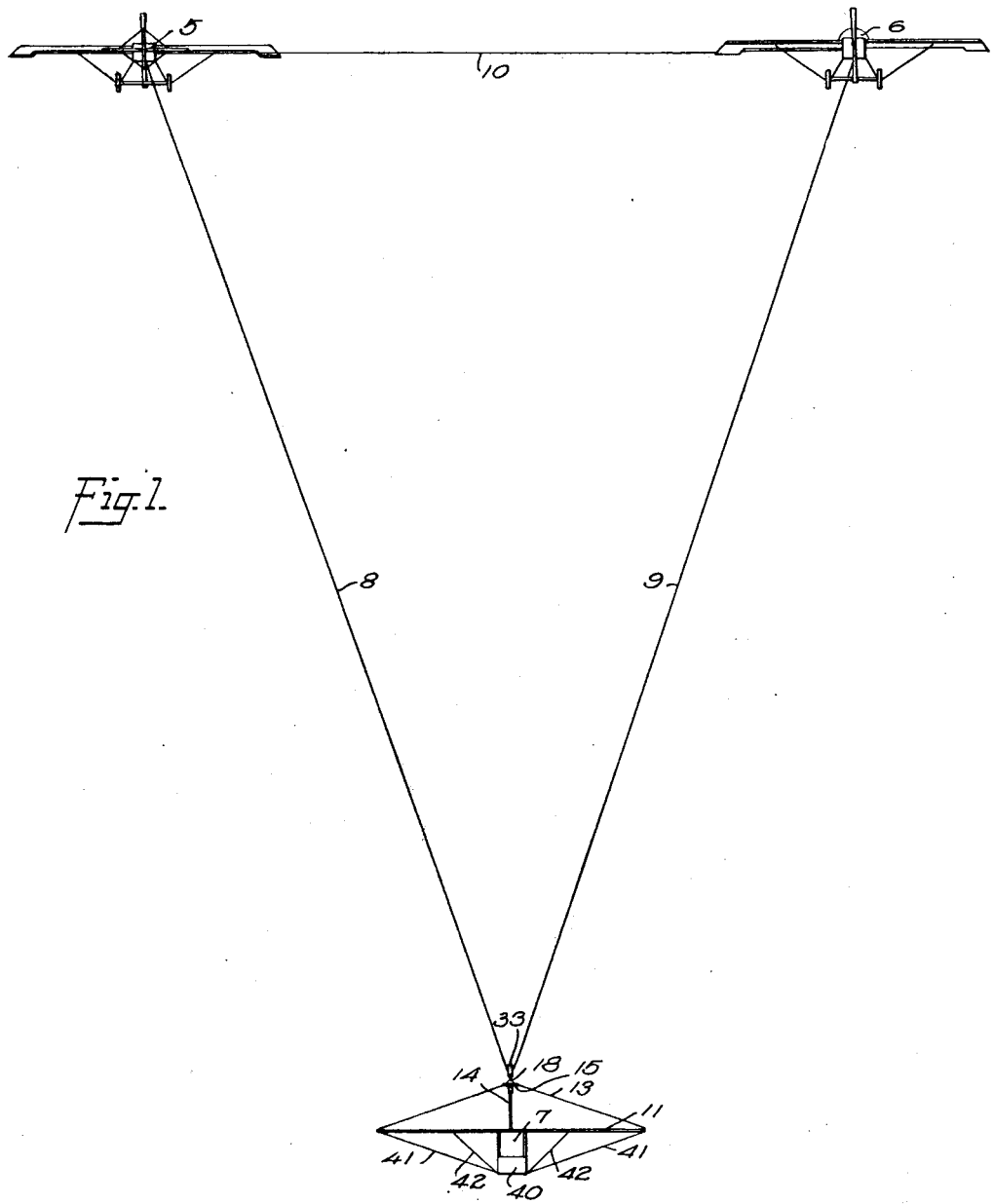

UNITED STATES PATENT OFFICE.

JOHN McCURRY, OF PHILADELPHIA, PENNSYLVANIA.

HOVERING-FLIGHT AEROPLANE SYSTEM.

1,181,784.  Specification of Letters Patent.  Patented May 2, 1916.

Application filed October 7, 1915. Serial No. 54,599.

*To all whom it may concern:*

Be it known that I, JOHN McCURRY, a subject of the King of Great Britain, and a resident of Philadelphia, in the county of Philadelphia, State of Pennsylvania, have invented a new and Improved Hovering-Flight Aeroplane System, of which the following is a full, clear, and exact description.

My invention relates to aeroplanes and systems for utilizing the power thereof, my more particular purpose being to provide an aeroplane system capable of supporting passengers in hovering flight—that is practically stationary in the air.

As is well-known in this art, an ordinary aeroplane must keep moving in order to remain in air, at least under normal atmospheric conditions. It is, therefore, difficult to support a platform or the like by means of aeroplanes in such manner as to cause the platform to hover in a position approximately stationary. Again the noise made by an aeroplane is usually very loud and upon this account the utility of the aeroplane, as ordinarily used, is really impaired, as owing to the noise the aviator is unable to use his ears for listening to sounds other than the noise made by the machine. It is also well understood in this art that the part of the aeroplane supporting the aviator or passengers, is ordinarily subjected to intense vibration owing to the proximity of the propeller blades and engine to other parts of the machine.

What I seek to do is to provide an aeroplane system comprising a platform for supporting passengers, this platform being suspended from aeroplanes flying in the air and having such movement relatively to each other and to the earth as to enable the platform to hover in the air. By this means the passengers supported by the platform are maintained if desired at a particular point for a long period of time. They are far enough from the aeroplanes to avoid embarrassment from either the noise or the vibration above mentioned.

Reference is made to the accompanying drawings forming a part of this specification, and in which like letters indicate like parts.

Figure 1 is an elevation showing my system complete; Fig. 2 is a plan view of the system while in action; Fig. 3 is a section showing a suspension joint for supporting the passenger platform and parts immediately associated therewith; Fig. 4 is a cross section through the frame work of one of the aeroplanes.

Two aeroplanes are shown at 5, 6, and at 7 is a car which I designate as a glider. This car and parts immediately associated therewith is suspended by means of a cable, which extends downwardly from the aeroplane 5, as shown at 8, and upwardly as indicated at 9, so as to connect with the aeroplane 6. A flexible connection 10, preferably a wire cable, smaller than the one just mentioned extends from one of the aeroplanes to the other. The glider 7 is provided with a plane 11, which is disposed substantially horizontally. The glider is further provided with a rudder 12, movable by the wind, for the purpose of maintaining the glider in a predetermined position relatively to the direction of the wind. Stay wires 13 are connected to the corners of the plane 11, and also to a center post 14. The upper end of this center post carries a substantially hemispherical bearing member 15, the latter being secured firmly to the center post, and locked by aid of nut locks 16, 17. Another bearing member 18 is provided with a flaring mouth 19, the same having an opening 20 of substantially frusto-conical form. A ball 21 is provided with holes 22, and is hollow. It contains a quantity of oil 23 for purposes of lubrication. The bearing members 15 and 18 are held together by bolts 24. The bearing member 15 is provided with ears 25, with which the stay wires 13 are connected. The ball 21 carries a socket 26 and extending into this socket is a rod 27, held in position by a pin 28. The rod 27 is connected with a sleeve 31, and nut locks 29, 30 encircle the rod 27 in order to prevent motion between it and the sleeve 31. This sleeve is provided with a forked portion 32, and this portion carries a pulley 33, which is journaled upon a pin 34. The bearing members 15 and 18 together constitute a shell in which the ball 21 is housed, so that the rod 27 and the center post 14 are connected together by a ball joint having the office of a universal joint. The rod 27 can turn freely in relation to the center post 14, and may also rock to different angles relatively thereto.

The two aeroplanes are preferably alike, and may be of the usual or any desired construction. In this particular instance each aeroplane is provided with vertically disposed frame bars 34ᵃ and horizontally disposed frame bars 35. A bracket 36 is mounted upon one of the bars 34ᵃ, and a bracket 37 is carried by one of the bars 35. Pulleys 38, 39, are journaled upon the brackets 36, 37, and partially wound upon these pulleys are portions of the two cables, as may be understood from Fig. 4.

Below the plane 11 is a basket 40 for containing the passengers, together with any apparatus to be used by the passengers. The stay wires 41, 42, extend from the basket 40 to the plane 11.

It will be noted that two aeroplanes thus connected and arranged will suspend double the weight which can be supported by a single aeroplane. Such being the case, this device is suitable for carrying heavy burdens through the air.

While I have in this particular instance shown only two aeroplanes, I do not wish to limit myself to the use of this particular number.

The operation of my device is as follows: The aeroplanes 5 and 6 being in motion they move in circles as indicated by the curved arrows in Fig. 2. As an individual aeroplane can be caused to describe a circle, even while the wind is blowing, the two aeroplanes can be so handled as to each describe the same circle. The glider, therefore, is simply suspended in mid-air. If now all adjustments be properly arranged, and the aeroplanes be skilfully handled by the aviators accompanying them, the glider may be held for hours at a time in a position practically stationary with reference to the earth. Photographs may be taken from it and by its aid military and other observations can be made, with as much accuracy as they would be if made from any other stationary elevation.

The cable 10 is not strictly essential, and may be omitted if desired.

I do not limit myself to the precise construction shown; neither do I limit myself to the use of any particular dimensions, measurements or sizes, for the different component parts of my system.

Having thus described my invention what I claim as new and desire to secure by Letters Patent is as follows:

1. An aeroplane system, comprising a car for carrying passengers, a swivel supported on said car, a pulley connected with the swivel, a flexible connection engaging said pulley, and a pair of aeroplanes to which the ends of said flexible connection are secured, the car being suspended a distance below the aeroplane solely through the medium of said flexible connection.

2. An aeroplane system, comprising a car, a plurality of aeroplanes, flexible means for suspending the car from said aeroplanes, connections between the said flexible means and the car adapted to turn and to rock relative to the car to permit the aeroplanes to fly in circles above the car and thus sustain the car, and a rudder on the car controllable by the direction of the wind for maintaining the car in a predetermined position.

3. An aeroplane system comprising a car, a member supported on said car at the center thereof and mounted to turn and to rock, a plurality of aeroplanes, flexible connections between the aeroplanes to limit the distance that the aeroplanes can move apart, and a cable having guided movement on the said member, the said cable being connected with the aeroplanes for suspending the car below the aeroplanes and maintaining the same approximately stationary.

4. The combination of a car provided with a center post, a rod connected with said center post by a universal joint, said rod being thus swiveled relatively to said center post, a pulley carried by said rod, a rudder controllable by the direction of the wind for maintaining said car in a predetermined position relatively to the direction of the wind, a cable engaging said pulley, and a pair of aeroplanes each connected with one end of said cable.

5. The combination of a car provided with a center post, a rod connected by a universal joint with the center post, a pulley carried by said rod, a cable engaging said pulley, and a pair of aeroplanes each connected with one end of the cable for suspending the car.

6. The combination of a car provided with a center post, a rod carrying a pulley, a universal joint connecting said rod with the center post, a cable engaging said pulley, a pair of aeroplanes, and pulleys on the aeroplanes on which the ends of the cable are wound.

7. The combination of a car having a substantially horizontally disposed plane the car being provided with a rudder and having a basket below the plane and connected by stay wires therewith, a center post on said car, stay wires connecting the corners of the plane with the center post, a rod carrying a pulley, a universal joint connecting said rod with the center post, a cable engaging the said pulley, and aeroplanes above the car with which the ends of said cable are connected.

In testimony whereof I have signed my name to this specification in the presence of two subscribing witnesses.

JOHN McCURRY.

Witnesses:
 LEO SOLOMON,
 HYMAN KURTZMAN.